(12) United States Patent
Fereira Da Silva

(10) Patent No.: US 6,820,933 B2
(45) Date of Patent: Nov. 23, 2004

(54) SPINE SUPPORT FOR VEHICLE SEATS

(75) Inventor: Manuel Fernando Braga Fereira Da Silva, Maja (PT)

(73) Assignee: Fico Cables, LDA, Maia (PT)

( * ) Notice: Subject to any disclaimer, the term of this patent is extended or adjusted under 35 U.S.C. 154(b) by 0 days.

(21) Appl. No.: 10/297,772

(22) PCT Filed: Jun. 19, 2001

(86) PCT No.: PCT/EP01/06914
§ 371 (c)(1),
(2), (4) Date: Apr. 8, 2003

(87) PCT Pub. No.: WO01/98105
PCT Pub. Date: Dec. 27, 2001

(65) Prior Publication Data
US 2003/0164634 A1 Sep. 4, 2003

(30) Foreign Application Priority Data
Jun. 19, 2000 (DE) .......................... 100 30 065

(51) Int. Cl.[7] .............................. A47C 3/025
(52) U.S. Cl. .................................. 297/284.1
(58) Field of Search .......................... 297/284.4, 284.1, 297/284.7, 284.3, 284.8

(56) References Cited

U.S. PATENT DOCUMENTS 5,217,278 A * 6/1993 Harrison et al.
5,449,219 A * 9/1995 Hay et al.
5,474,358 A * 12/1995 Maeyaert
5,518,294 A 5/1996 Ligon, Sr. et al.
5,704,687 A * 1/1998 Klingler
5,769,490 A * 6/1998 Falzon
6,079,783 A * 6/2000 Schuster, Sr. et al.
6,139,102 A * 10/2000 von Moller
6,357,826 B1 * 3/2002 Gabas et al.
6,601,919 B1 * 8/2003 Deceuninck

FOREIGN PATENT DOCUMENTS

DE    198 26 597    12/1999
EP    0 746 219     12/1996
WO    00/00064      1/2000

* cited by examiner

Primary Examiner—Milton Nelson, Jr.
(74) Attorney, Agent, or Firm—Renner, Otto, Boisselle & Sklar, LLP

(57) ABSTRACT

A spine support is provided in particular for the use in a seat of a vehicle with at least one bending element (20) and at least two independent operating elements (41a, 42a, 41b, 42b) to bend the bending element (20), wherein the first operating element (41a, 42a) engages a first part of the bending element (20) to cause first curvature of the spine support and the second bending element (41b, 42b) engages a second part of the bending element (20) to cause a second curvature of the spine support so that the overall curved shape of the spine support is a superposition of the first and second curvature. According to a further aspect, the present invention relates to a spine support, in particular for the use in the seat of a vehicle with at least one bending element (20) and at least one supporting element (30'), wherein the at least one supporting element (30') is flexibly attached to the at least one bending element (20).

18 Claims, 2 Drawing Sheets

Fig. 2 a) b) c)

SPINE SUPPORT FOR VEHICLE SEATS

1. TECHNICAL FIELD

Figure 1:
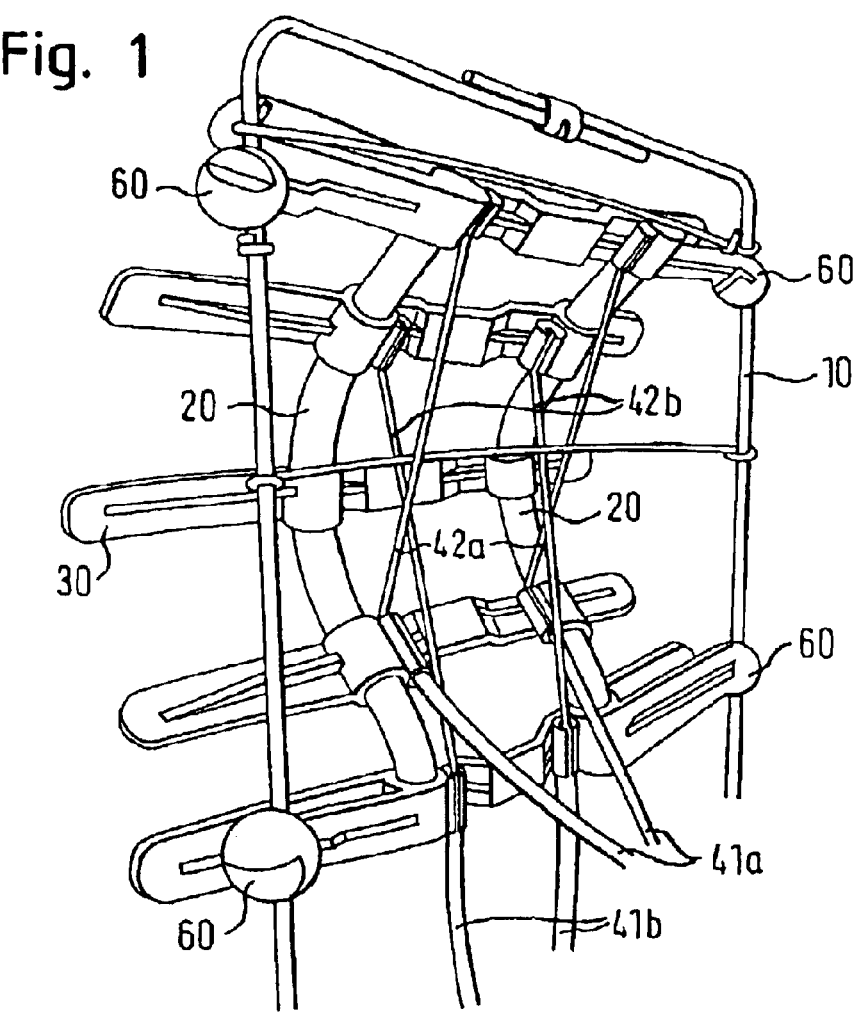

The present invention relates to a spine support, in particular for the use in a seat of a vehicle.

2. THE PRIOR ART

Spine supports are typically built into a seat, chair or the like to provide the backrest with a curved shape to support the vertebrae of the spine so that even under prolonged use, for example of an office chair or a seat of a vehicle a comfortable and healthy posture is assured.

For the adaptation to the anatomy of the respective user, spine supports are often adjustable. In this context typically not only an adjustment of the curvature (more or less curved) but also a height adjustment is provided allowing that the shape of the backrest of for example the seat of a car can be adapted to persons of a different body height. By means of the height adjustment the vertical position of the curvature of the spine support can be modified.

Spine supports of the above mentioned type, as they are described for example in DE 43 14 325 and DE 42 20 995, consist typically of two vertically arranged struts or the like to which a plurality of lateral laths are attached. By means of one or more tightening devices, for example bowden cables or tightening straps which engage the topmost and lowermost lath, the two vertical struts can be adjustably bent so that the lateral laths arranged thereon form approximately a tunnel vault. When seen from the side, an essentially circular cross-section of the spine support is obtained. From the AT 396 734, a construction is further known, where several different vaults controlled by a common main bowden cable are superpositioned to a resulting shape.

A farther spine support construction is known from the DE 29 35 352.

For the height adjustment, the topmost and lowermost lateral lath are typically slidably arranged on one or more vertical rods so that the complete support can be adjustably moved up and down by means of a further bowden cable or the like.

Although theoretically the curvature and the position of a spine support can be adjusted with the described constructions according to the prior art, several difficulties arise during operation:

When the support is used in the backrest for example of the seat of a vehicle, the flexible framework of struts and lateral laths is arranged below the upholstery. As a result, a curved spine support can, if at all, only with difficulties be moved up or down, because of the pressure and the corresponding friction under a movement of all lateral laths along the upholstery. An easy vertical adjustment is only possible, if the spine support is completely relaxed, i.e. without any curvature. This, however, leads to a complicated procedure, since for every height adjustment the spine support has at first to be brought into the non-curved starting position and can only after the vertical adjustment be bent again.

Further, the upholstery is often heavily compressed in the area of the curvature of the support by the lateral laths so that the backrest loses its original flexibility. In some cases, a spine support in a vehicle being for this reason too inflexible may cause in case of an accident injuries of the spine.

It is therefore the problem of the present invention to provide a simple an inexpensive spine support which overcomes the above explained disadvantages of the prior art and wherein the position of the curvature can be easily adjusted.

According to a further aspect, the present invention is based on the problem to provide a simple spine support having also in the curved state a sufficient flexibility to improve the comfort and the safety of the user.

3. SUMMARY OF THE INVENTION

The present invention relates to a spine support, in particular for the use in a seat of a vehicle with at least one bending element and at least two independent operating elements to bend the bending element, wherein the first operating element engages a first portion of the bending element to produce a first curvature of the spine support and the second operating element engages a second portion of the bending element to produce a second curvature of the spine support so that the overall curved shape of the spine support is a superposition of the first and second curvature.

Depending on the extent to which each operating element is tightened, the spine support of the construction according to the invention is bent in different portions. As a result, the position of the vertex of the curved shape can be modified without having to move the complete spine support as in the prior art. An arrangement of the first and second portion above each other is particularly preferred, in order to achieve a height adjustability of the curved shape. A vertical movement for adjusting the spine support against the frictional force of the surrounding upholstery is no longer necessary.

Preferably, a plurality of supporting elements are attached to the at least one bending element. Whereas the at least one bending element determines the curved shape of the spine support, the plurality of supporting elements distributes this shape onto the area of the backrest.

The first and the second operating element comprise preferably at least one bowden cable, wherein the sheath of the first bowden cable is preferably attached to the bending elements in the part of a supporting element which is not the lowermost supporting element and wherein the end of the inner steel cable of the first bowden cable is attached in the part of the topmost supporting element or vice versa. The sheath of the second bowden cable is on the contrary preferably attached at the bending elements in the part of the lowermost supporting element and the end of the inner steel cable of the second bowden cable is attached in the part of a supporting element which is not the topmost supporting element or vice versa. Depending on whether the first, the second or both bowden cables are tightened, the curved shape is particularly curved in the upper, the lower or the intermediate part.

According to a further aspect, the present invention relates to a spine support, in particular for the use in the seat of a vehicle with at least one bending element and at least one supporting element, wherein the at least one supporting element is flexibly mounted to the at least one bending element. By means of the flexible mounting of the at least one supporting element to the at least one bending element, the spine support and therefore also the backrest of the corresponding seat has also in the curved state the necessary flexibility for a high degree of comfort and safety.

Preferably, a plurality of supporting elements are arranged on the two bending elements comprising each preferably one intermediate part interconnecting the two bending elements and two flexibly suspended supporting areas. Thus, a flexible overall construction is provided extending preferably over the complete width of the spine support. In a particularly preferred embodiment the support areas are in a z-shaped manner interconnected with the intermediate part. The z-shaped connection provides in a simple and cost efficient way the flexibility according to the invention.

Preferably, the supporting areas are forward bent in the outer areas and backward bent in the inner area to provide the backrest with the inserted spine support with the shape of an integral-molded seat. This improves in particular in the case of a seat for a vehicle the comfort of the seat.

Further improvements are the subject matter of further depending claims.

4. SHORT DESCRIPTION OF THE DRAWING

Figure 3:
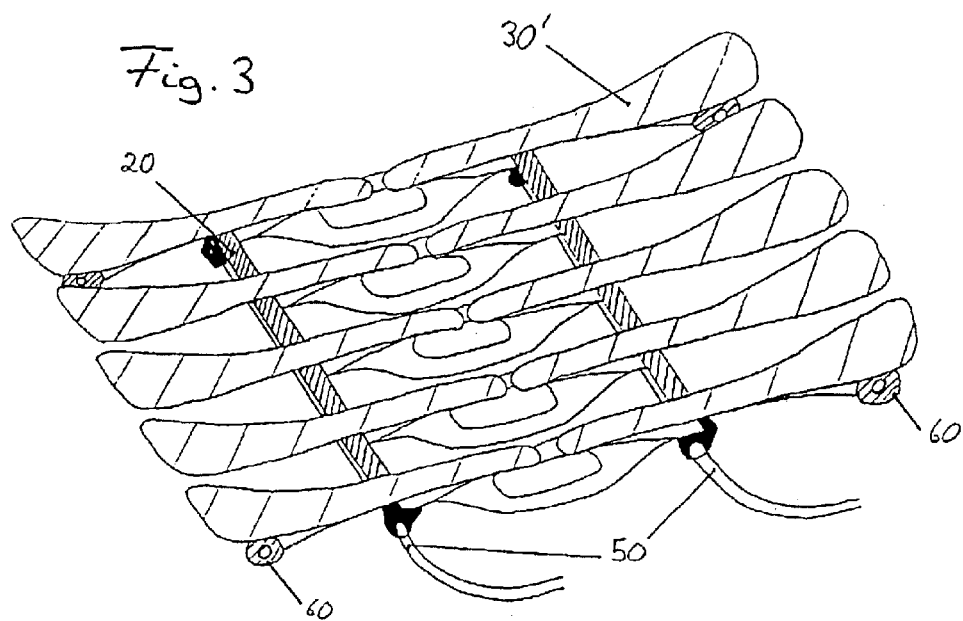
Figure 4:
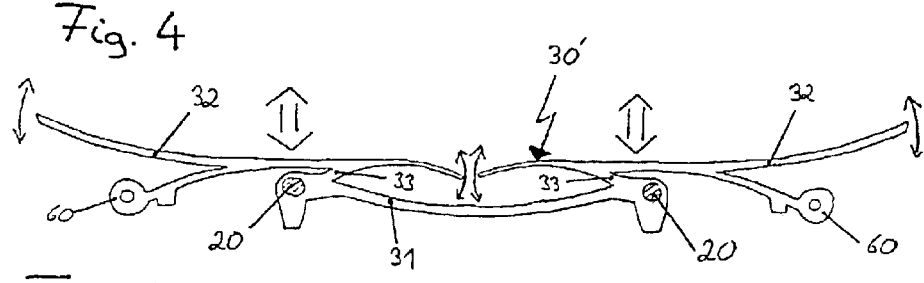
Figure 5:
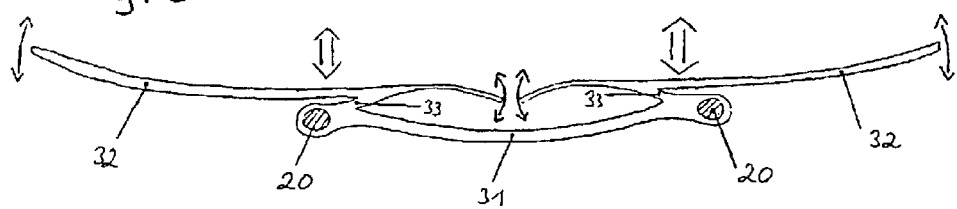

In the following detailed description presently preferred embodiments of the present invention are described with reference to the drawing which shows:

FIG. 1: A three-dimensional representation of a first preferred embodiment of the spine support according to the invention;

FIGS. 2a–2c: A schematic representation of possible curved shapes of the spine support according to the invention;

FIG. 3: A three-dimensional representation of a further preferred embodiment of the spine support according to the invention;

FIG. 4: A schematic side view of the topmost or lowermost supporting element of the embodiment of FIG. 3;

FIG. 5: A schematic side view of an intermediate supporting element of the embodiment of FIG. 3.

5. DETAILED DESCRIPTION OF THE INVENTION

In the following particularly preferred embodiments of the invention are described with reference to spine supports for a seat of a vehicle. However, it is to be understood that the present invention can also be used in other fields, for example for office chairs or in medical devices.

Referring to FIG. 1, two essentially vertically arranged bending elements 20 are provided in an outer frame 10. Preferably, the bending elements 20 are made of coil springs covered with a plastic material having permanently the necessary flexibility. Conceivable, however, are also flexible laths or elements made of an elastic plastic material. Although in the preferred embodiment two bending elements 20 are shown, the construction according to the invention can also be realized with more than two bending elements 20.

For transferring the curvature also into the lateral outer parts of the backrest, several supporting elements 30 are essentially horizontally attached to the two bending elements 20. In the preferred embodiment of FIG. 1 five supporting elements 30 are provided, other numbers are also possible. In case of a curvature of the bending elements 20 the supporting elements 20 are thus forming a vaulted area leading in case of an arrangement of the spine support according to the invention below the upholstery (not shown) of a seat of a vehicle to the anatomically desired curvature of a part of the backrest. The flexible framework formed by the bending elements 20 and the supporting elements 30 of the embodiment shown in FIG. 1 can also be replaced by a flexible plate made for example of a suitable plastic material.

For achieving the adjustability of the curvature of the spine support according to the invention, preferably two pairs of bowden cables 41a, 42a, 41b, 42b are provided, which engage different portions of the bending elements 20. The outer sheaths 41a of the first pair of bowden cables are attached in the part of the second lowest supporting element at the bending elements 20, whereas the corresponding ends of the inner steel cables 42a are fixed in the part of the topmost supporting element. The outer sheaths 41b of the second pair of bowden cables are on the contrary fixed to the two bending elements 20 in the part of the lowermost supporting element and the corresponding steel cables 42b are attached in the part of the second supporting element from the top (obviously it is also without any problems possible to interchange the mounting of the sheaths 41a, 41b and the ends 42a, 42b of the inner steel cables).

As a result, the operation of the first pair of bowden cables 41a, 42a leads to a curvature of the upper portion of the bending elements 20 and thus of the spine support (cf. the schematic side view of the spine support in FIG. 2a, the black rectangles show the starting position of the supporting elements 30, the white rectangles their position in the curved spine support), whereas the operation of the second pair of bowden cables 41b, 42b causes a curvature of the lower portions of the bending elements 20 (cf. schematic side view in FIG. 2b). If both pairs of bowden cables are simultaneously tightened, the schematically shown curvature of FIG. 2c is obtained, i.e. the superposition of the curvatures of FIG. 2a and FIG. 2b (indicated by the dashed lines). As shown by the small horizontal arrow in FIG. 2c the vertex of the resulting curved shape is in this case essentially in the centre of the spine support. The superposition of the curvatures caused by the two pairs shown in FIG. 2c is possible, since the two portions of the bending elements 20 which are bent by the first pair 41a, 42a and from the second pair 41b, 42b of bowden cables, respectively, overlap each other. Although in the preferred embodiment shown in FIG. 1 only two pairs of bowden cables 41a, 42a, 41b, 42b are shown, the construction according to the invention can be modified to include more separate curvatures in order to provide more complex shapes. The independent operation, however, of the separate pairs of bowden cables is important, in order to allow a continuous transition from one curved shape of FIGS. 2a to 2c to another.

It is a significant advantage of the construction according to the invention that for a height adjustment the complete spine support does not have to be moved up and down along the frame 10 but that desired portions of the spine support can be selectively bent. Thus, on the one hand the adjustment of the desired curvature is facilitated, on the other hand a greater number of different shapes is possible.

Instead of the explained bending of the bending elements 20 with bowden cables, also other operating elements can be used. For example, the use of tightening straps or the like is conceivable, which are rolled onto an axis. Such arrangements are known from the prior art and are therefore not further discussed in the following.

For operating the preferably used bowden cables 41a, 42a, 41b, 42b known control units can be used. The adjustment can be performed manually but also by using one or more electric motors. In a particularly preferred embodiment (not shown) the control allows with suitable mechanical or electronic means to determine with a first control element the degree of the bending and with a further control element the vertical position by a suitable operation of the two pairs of bowden cables 41a, 42a, 41b, 42b.

FIG. 3 shows a further preferred embodiment of the spine support according to the invention, where instead of the continuous supporting elements 30 of FIG. 1 supporting elements 30' comprising three parts are used. As can be seen from the side views in FIG. 4 and FIG. 5 a supporting element 30' comprises preferably an intermediate part 31 interconnecting the two bending elements 20 and two lateral supporting areas 32 which are each in a preferably z-shaped manner connected to the corresponding bending element 20 via an intermediate carrier 33. For facilitating the representation, only one pair 50 of bowden cables is shown in FIG. 3, however, it is to be understood that the preferred supporting elements 30 can also be used in case of a spine support of FIG. 1.

The particularly preferred z-shaped interconnection between the intermediate part 31 (and thus the bending elements 20) and the support areas 32 allows on the one hand the tilting movement of the supporting areas 32 schematically indicated with the thin double headed arrows in FIGS. 4 and 5, on the other hand also a general movement back and forth as indicated by the thick double headed arrows. The desired springy or flexible properties of the supporting elements 30' are determined by the selection of the used materials (for example plastic materials as polyamide No. 6 but also metal alloys or suitably selected wood) and by the dimensioning of the intermediate carrier 33. As a result, a spine support with an improved flexibility is provided, since the springy properties of the supporting elements 30' are not significantly influenced by the curvature of the bending elements 20 and thus protect the sensible part of the spine against an excessive stress. As an alternative to the preferred z-shaped connection, it is also conceivable to the use special spring elements, for example elastomer buffers between the intermediate part 31 or the bending elements 20 and the supporting areas 32.

In order to provide the backrest in which the spine support according to the invention is used with a shape similar to an integral-molded seat, the lateral support areas, which extend preferably essentially over the complete width of the spine support, are preferably in the outer part slightly forward and in the inner part slightly backwards bent. Such a shape is in particular used for seats of vehicles.

Since the topmost and the lowermost supporting element 30' remains in the plane of the outer frame, independently from the adjusted curvature, additional lateral fixations 60 are preferably provided for increasing the stability (cf. also FIG. 1), through which the lateral rods of the frame 10 extend.

What is claimed is:

1. A spine support for use in a seat of a vehicle, comprising:
   a) at least one bending element;
   b) at least two independent operating elements to bend the at least one bending element, wherein
   c) the first operating element selectively bends a first portion of the bending element to cause a first curvature of the spine support and the second operating element selectively bends a second portion of the bending element to cause a second curvature of the spine support, and
   d) the first portion of the bending element and the second portion of the bending element overlap each other, so that an overall curved shape of the spine support results as a superposition of the first and second curvatures.

2. A spine support according to claim 1, wherein the first curvature caused by the first operating element is different in shape compared to the second curvature caused by the second operating element.

3. A spine support according to claim 1, wherein the at least two independent operating elements allow a continuous transition from one overall curved shape of the spine support to another overall curved shape of the spine support.

4. A spine support according to claim 3, wherein the continuous transition from one overall curved shape of the spine support to another overall curved shape of the spine support allows a height adjustment of a vertex of the overall curved shape of the spine support.

5. A spine support according to claim 1, wherein the first portion of the at least one bending element is arranged above the second portion of the at least one bending element to provide a height adjustability of a vertex of the overall curved shape of the spine support.

6. A spine support according to claim 1, wherein a plurality of supporting elements are attached to the at least one bending element.

7. A spine support according to claim 1, wherein the first and the second operating elements each comprise at least one bowden cable.

8. A spine support for use in a seat of a vehicle, comprising:
   a) at least one bending element;
   b) at least two independent operating elements to bend the at least one bending element, wherein
   c) the first operating element selectively bends a first portion of the bending element to cause a first curvature of the spine support and the second operating element selectively bends a second portion of the bending element to cause a second curvature of the spine support, so that an overall curved shape of the spine support results as a superposition of the first and second curvatures,
   d) the first and the second operating elements each comprise at least one bowden cable, and
   e) a sheath of the at least one bowden cable of the first operating element is attached to the bending element at a location of a supporting element, which is not a lowermost supporting element, and wherein an end of an inner steel cable of the at least one bowden cable of the first operating element is attached at a location of a topmost supporting element.

9. A spine support according to claim 8, wherein a sheath of the at least one bowden cable of the second operating element is attached to the bending element at a location of a lowermost supporting element, and wherein an end of an inner steel cable of the at least one bowden cable of the second operating element is attached at a location of a supporting element which is not a topmost supporting element.

10. A spine support for use in a seat of a vehicle, comprising:
    a) at least one bending element;
    b) at least two independent operating elements to bend the at least one bending element, wherein
    c) the first operating element selectively bends a first portion of the bending element to cause a first curvature of the spine support and the second operating element selectively bends a second portion of the bending element to cause a second curvature of the spine support, so that an overall curved shape of the spine support results as a superposition of the first and second curvatures,
    d) the at least one bending element includes a pair of essentially parallel bending elements, and
    e) the operating elements each comprise a pair of bowden cables.

11. A spine support for use in a seat of a vehicle, comprising:
    a) two bending elements and at least one supporting element including, supporting areas which are flexibly attached to the bending elements;

b) at least two independent operating elements, each comprising at least one bowden cable, to bend the bending element, wherein c) the first operating element selectively bends a first portion of each bending element to cause a first curvature of the spine support and the second operating element engages a second portion of each bending element to cause a second curvature of the spine support, so that an overall curved shape of the spine support results as a superposition of the first and second curvatures.

12. A spine support according to claim 11, wherein plural supporting elements are arranged on the two bending elements, each supporting element comprising each an intermediate part interconnecting the two bending elements and two flexibly suspended supporting areas.

13. A spine support according to claim 11, wherein the supporting areas are in a z-shaped manner connected to an intermediate part interconnecting the two bending elements and two flexibly suspended supporting areas.

14. A spine support according to claim 13, wherein the supporting areas are forwardly bent at outer parts thereof and backwardly bent at an inner part.

15. A spine support according to claim 11, wherein the supporting areas extend essentially over the complete width of the spine support.

16. A spine support for use in a seat of a vehicle, comprising:

a) at least one bending element;

b) at least two independent operating elements to bend the at least one bending element, wherein c) the first operating element selectively bends a first portion of the bending element to cause a first curvature of the spine support and the second operating element selectively bends a second portion of the bending element to cause a second curvature of the spine support, so that an overall curved shape of the spine support results as a superposition of the first and second curvatures, d) the first and the second operating elements each comprise at least one bowden cable, and e) a sheath of the at least one bowden cable of the second operating element is attached to the bending element at a location of a lowermost supporting element and wherein an end of an inner steel cable of the at least one bowden cable of the second operating element is attached at a location of a support element, which is not a topmost supporting element.

17. A spine support according to claim 16, wherein suspensions for fixing to an outer frame are provided at supporting areas of the topmost and lowermost supporting element.

18. A spine support for use in a seat of a vehicle, comprising:

a) at least one bending element;

b) at least two independent operating elements to bend the at least one bending element, wherein c) the first operating element selectively bends a first portion of the bending element to cause a first curvature of the spine support and the second operating element selectively bends a second portion of the bending element to cause a second curvature of the spine support, so that an overall curved shape of the spine support results as a superposition of the first and second curvatures, d) the at least one bending element comprises an elastic coil spring.

* * * * *